J. WOLPERT.
SHOCK ABSORBER FOR VEHICLES.
APPLICATION FILED MAY 14, 1912.
1,057,105.
Patented Mar. 25, 1913.
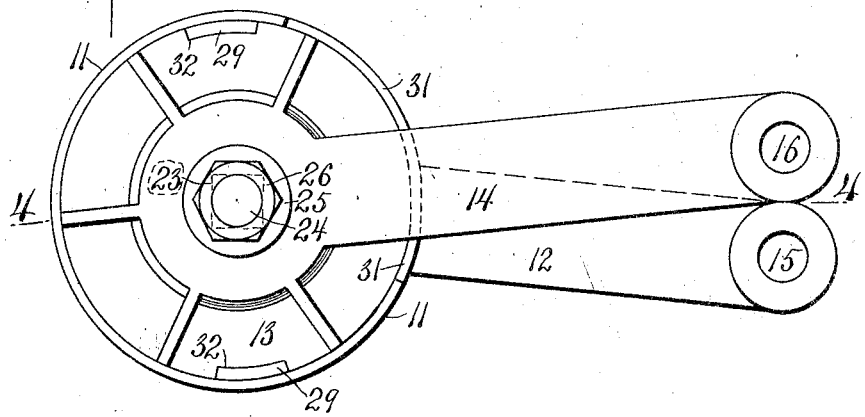
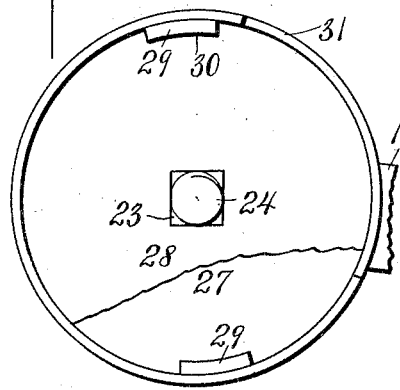 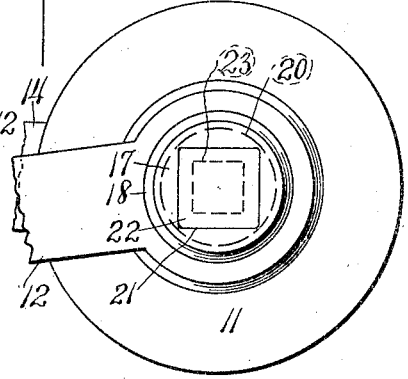
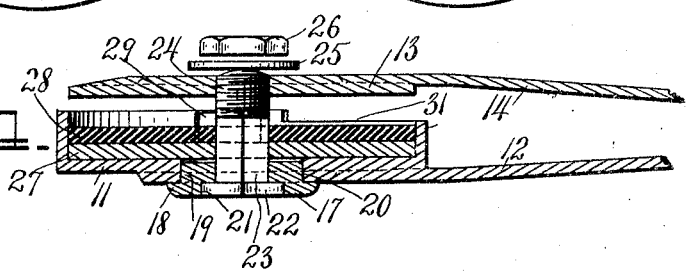
WITNESSES
INVENTOR
Joseph Wolpert.
By Walter Allen, Attorney

UNITED STATES PATENT OFFICE.

JOSEPH WOLPERT, OF NEW BRUNSWICK, NEW JERSEY, ASSIGNOR TO JOSEPH F. WOLPERT AND EDWARD A. MEAGHER, BOTH OF NEW BRUNSWICK, NEW JERSEY.

SHOCK-ABSORBER FOR VEHICLES.

1,057,105.  Specification of Letters Patent.  Patented Mar. 25, 1913.

Application filed May 14, 1912. Serial No. 697,130.

*To all whom it may concern:*

Be it known that I, JOSEPH WOLPERT, a citizen of the United States of America, and a resident of New Brunswick, in the county of Middlesex and State of New Jersey, have invented certain new and useful Improvements in Shock-Absorbers for Vehicles, of which the following is a specification.

My invention relates particularly to that class of shock absorbers which depends on friction between surfaces for its absorbing qualities, and which comprises a circular boxing, which contains the absorbing parts, and a pair of radially extending arms, one of which is attached to the running-gear and the other of which is attached to the body of the vehicle, the circular boxing being thus suspended between the running-gear and the body of the vehicle.

The object of my invention is to produce a simple and commercially practical device of this character which will retard the vehicle spring in its action both when expanding and when contracting.

In the drawings which form a part of this specification Figure 1 is a front side view of my improved shock absorber; Fig. 2 is a front side view with the cover plate and its attached arm removed from the flanged boxing and parts broken away, Fig. 3 is a rear side view, the attaching arms being broken away, and Fig. 4 is a horizontal section on the line 4—4 of Fig. 1.

11 is the circular flanged boxing providing a circular chamber and having attached thereto an attaching arm 12 of any convenient form. 13 is the circular cover plate fitting in the circular chamber of the boxing and having attached thereto the attaching arm 14 of any convenient form. The arms 12 and 14 are provided with the usual holes 15 and 16 for attaching them respectively to the running-gear and body of the vehicle or to the upper and lower members of a spring.

17 is a circular bushing having a flanged portion 18 and a neck portion 19, the neck portion being positioned in a centrally located circular hole 20 in the rear face of the boxing 11 and the flanged portion having a non-circular recess 21 in the face thereof adapted to receive the non-circular head 22 of a bolt having a non-circular stem 23. The non-circular stem 23 of the bolt passes through a corresponding non-circular hole in the bushing 17 and the opposite or screw threaded end 24 of the bolt passes through a non-circular hole in the cover plate 13, and through a washer 25 and is secured by a nut 26. The non-circular portion of the bolt is of sufficient length so that it projects into but not entirely through the non-circular hole in the cover plate, thus allowing for taking up wear without the washer coming against the non-circular bolt stem.

Between the inside face of the boxing 11 and the inside face of the cover plate 13 and fitting closely within the circular chamber are two plain disks 27 and 28, the inner disk 27 being of metal or other hard substance and lying adjacent the inside face of the boxing and the outer disk 28 being of rubber or other resilient material and located adjacent the inside face of the cover plate. Each of these plain disks has a central non-circular hole of a size to fit the non-circular bolt stem 23. The plain disks 27 and 28 and the cover plate are further locked together by circumferential segmental projections 29 on the disk 27 engaging circumferential segmental recesses 30 and 32 on the disk 28 and the cover plate 13 respectively. Recess 31 on the peripheral flange of the boxing allows oscillation of the attaching arm 14, the cover plate being located preferably within the lines of the boxing.

When the parts are assembled it will be seen that, owing to the non-circular shape of the recess 21, bolt head 22, stem portion 23, and holes through which it passes, the only relative movement between parts is a movement between the boxing as one part and the rest of the device as the other part. It is obvious that either the non-circularity of the holes and stem or the use of the projections 29 and recesses 30 and 32 might be omitted or dispensed with but it is preferable for constructive reasons to employ both. The bushing, and bolt might also be integral and perform the same service. The movement of parts causes friction between the inside face of the boxing and hard disk 27, which friction varies according to the amount of pressure obtained by the rotation of the nut 26.

By this construction it will be observed that all of the wear comes on the hard disk and the contacting inside face of the boxing, and the advantage of spring or resilient action can be had without the destruction of the resilient means by constant use, or the destruction of parts by sudden severe jolts of the vehicle.

Having thus described my invention the following is what I claim as new therein and desire to secure by Letters Patent:

1. A shock absorber comprising a boxing providing a circular chamber and having an attaching arm, a central circular hole and a peripheral flange having a recess, a circular cover plate fitting closely in the circular chamber and having an attaching arm working in the recess of the peripheral flange and a central hole, an inner plain metal disk having a central hole and fitting closely within the circular chamber and working against the inside face of the boxing, an outer plain resilient disk having a central hole and fitting closely within the circular chamber, and seated between the metal disk and the inside face of the cover plate, a circular bushing mounted in the central circular hole of the boxing and having a stem extending through the holes of the disks and partly into the central hole of the cover plate, and formed with a screw threaded end, a securing nut mounted on the screw threaded end of the stem, and means for locking the disks and cover plate together.

2. A shock absorber comprising a boxing providing a circular chamber and having an attaching arm, a central circular hole and a peripheral flange having a recess, a circular cover plate fitting closely in the circular chamber and having an attaching arm, working in the recess of the peripheral flange, a central hole and a circumferential segmental recess, an inner plain metal disk having a central hole and a circumferential segmental projection, and fitting closely within the circular chamber and working against the inside face of the boxing, an outer plain resilient disk having a central hole and a circumferential segmental recess and fitting closely within the circular chamber and seated between the metal disk and the inside face of the cover plate, a circular bushing mounted in the central circular hole of the boxing and having a stem extending through the holes of the disks and partly into the central hole of the cover plate and formed with a screw threaded end and a securing nut mounted on the screw threaded end of the stem.

3. A shock absorber comprising a boxing providing a circular chamber and having an attaching arm, a central circular hole and a peripheral flange having a recess, a circular cover plate fitting closely in the circular chamber and having an attaching arm working in the recess of the peripheral flange, and a central non-circular hole, an inner plain metal disk having a central non-circular hole and fitting closely within the circular chamber and working against the inside face of the boxing, an outer plain resilient disk having a central non-circular hole and fitting closely within the circular chamber and seated between the metal disk and the inside face of the cover plate, a circular bushing mounted in the central circular hole of the boxing and having a non-circular stem extending through the non-circular holes of the disks and partly into the central non-circular hole of the cover plate, and formed with a screw threaded end and a securing nut mounted on the screw threaded end of the stem.

4. A shock absorber comprising a boxing providing a circular chamber and having an attaching arm, a central circular hole and a peripheral flange having a recess, a circular cover plate fitting closely in the circular chamber and having an attaching arm working in the recess of the peripheral flange and a central non-circular hole, an inner plain metal disk having a central non-circular hole and fitting closely within the circular chamber and working against the inside face of the boxing, an outer plain resilient disk having a central non-circular hole and fitting closely within the circular chamber and seated between the metal disk and the inside face of the cover plate, a circular bushing, having a flanged portion formed with a non-circular recess, and a neck portion formed with a non-circular hole, and mounted in the central circular hole of the boxing, a bolt having a non-circular head fitting in the non-circular recess of the bushing, a non-circular stem extending through the non-circular holes of the disks and partly into the non-circular hole of the cover plate, and formed with a screw threaded end and a securing nut.

5. A shock absorber comprising a boxing providing a circular chamber and having an attaching arm, a central circular hole and a peripheral flange, a cover plate fitting closely in the circular chamber and having an attaching arm and a central hole, an inner plain metal disk having a central hole and fitting closely within the circular chamber and working against the inside face of the boxing, an outer plain resilient disk having a central hole and fitting closely within the circular chamber and seated between the metal disk and the inside face of the cover plate, a circular bushing mounted in the central circular hole of the boxing and having a stem extending through the holes of the disks and into the central hole of the cover plate, and formed with a screw threaded end, a securing nut mounted on the screw threaded end of the stem, and means for locking the disks and cover plate together.

JOSEPH WOLPERT.

Witnesses:
JOSEPH A. SEDAM,
CHARLES W. SEDAM, Jr.